US012643352B2

(12) United States Patent
Guiet et al.

(10) Patent No.: US 12,643,352 B2
(45) Date of Patent: Jun. 2, 2026

(54) DRAWBAR AND IMPLEMENT

(71) Applicant: DEERE & COMPANY, Moline, IL (US)

(72) Inventors: Lionel Guiet, Gray (FR); Matthieu Dutertre, Chemaudin (FR)

(73) Assignee: DEERE & COMPANY, Moline, IL (US)

( * ) Notice: Subject to any disclaimer, the term of this patent is extended or adjusted under 35 U.S.C. 154(b) by 411 days.

(21) Appl. No.: 18/364,555

(22) Filed: Aug. 3, 2023

(65) Prior Publication Data

US 2024/0100894 A1 Mar. 28, 2024

(30) Foreign Application Priority Data

Sep. 23, 2022 (DE) .......................... 102022124468.7

(51) Int. Cl.
B60D 1/167 (2006.01)
B60D 1/00 (2006.01)

(52) U.S. Cl.
CPC ........ B60D 1/167 (2013.01); B60D 2001/008 (2013.01)

(58) Field of Classification Search
CPC .. B60D 1/167; B60D 2001/008; B60D 1/155; A01B 59/042
See application file for complete search history.

(56) References Cited

U.S. PATENT DOCUMENTS 3,812,919 A 5/1974 Baughman et al.
7,422,226 B2 * 9/2008 Hsueh ...................... B60D 1/32
280/455.1

9,370,137 B2 6/2016 Hennes
10,462,953 B2 * 11/2019 Frascella .............. A01B 59/043
10,710,421 B2 7/2020 De Craemer
11,425,853 B2 * 8/2022 Guiet ................... A01B 59/042
11,446,972 B2 * 9/2022 Guiet ................... A01B 59/002
2004/0212176 A1 * 10/2004 Colistro ................ B60D 1/075
280/482
2021/0243959 A1 8/2021 Bonte et al.

FOREIGN PATENT DOCUMENTS

DE 1156263 B 10/1963
DE 202012102356 U1 9/2013
EP 0806309 A1 11/1997
EP 3008985 B1 8/2017
EP 3689119 A1 8/2020
EP 3838633 A1 6/2021
EP 4074156 A1 10/2022
KR 101169319 B1 7/2012
KR 2095709 B1 4/2020

OTHER PUBLICATIONS

Extended European Search Report and Written Opinion issued in European Patent Application No. 23193088.4, dated Feb. 8, 2024, in 14 pages.

* cited by examiner

*Primary Examiner* — Valentin Neacsu
*Assistant Examiner* — Marlon A Arce

(57) ABSTRACT

A drawbar for an agricultural implement, in particular for an agricultural baler, includes a drawbar support and a coupling means. The coupling means is connected to the drawbar support. The drawbar support is configured in such a way that the coupling means can be brought by the drawbar support into two different positions relative to the drawbar support.

9 Claims, 6 Drawing Sheets

DRAWBAR AND IMPLEMENT

CROSS-REFERENCE TO RELATED APPLICATIONS

This application claims the benefit of German Patent Application DE102022124468.7, filed on Sep. 23, 2022, the disclosure of which is hereby incorporated by reference.

TECHNICAL FIELD

The disclosure generally relates to a drawbar for an agricultural implement.

BACKGROUND

Agricultural implements may include a drawbar for towing the implement with a towing vehicle. If the agricultural implement being towed is intended, for example, to travel laterally to the track when in an operating position, and centrally after the towing vehicle when being transported by road, it can be provided that the drawbar can deviate, translate, or move relative to the trailing implement. A drawbar of this type can be mounted at one end on the trailing implement portion, i.e., the trailing portion of the agricultural implement, so as to be pivotable about a vertical axis, for example by means of a pivot bearing, and moved for example by means of an adjustment means configured as a hydraulic cylinder.

Implements of this type can be hitched to towing vehicles of different configurations. In particular, the height of a towing device to which the implement is to be hitched by means of the drawbar thereof can vary. This can be due to structural differences in the towing vehicle. There is, however, also towing equipment which already has receiving points at different elevations.

It may be complex to adapt known drawbars or implements with a drawbar of this type to different elevations of a towing device of a towing vehicle.

SUMMARY

According to the disclosure, a drawbar for an implement is, in particular for an agricultural baler, is provided. The drawbar includes a drawbar support and a coupling means. The coupling means is connected, in particular rigidly and/or releasably connected, to the drawbar support. The coupling means can be fastened to the drawbar support, in particular rigidly and/or releasably fastened, or can be installed on the drawbar support, in particular rigidly and/or releasably installed. The drawbar support is configured in such a way that, by way of the drawbar support, the coupling means can be brought into, in particular can be arranged in, two different positions, in particular elevations, relative to the drawbar support.

In other words, the drawbar support can be configured in such a way that the drawbar support includes a first and a second operating position, in particular can be configured and/or arranged in a first and a second operating position. The coupling means can consequently be brought by the drawbar support into two different positions relative to the drawbar support. Specifically, in a first operating position of the drawbar support, the coupling means can be arranged in a first position, in particular a first elevation, relative to the drawbar support and, in a second operating position of the drawbar support, the coupling means can be arranged in a second position which differs from the first position, in particular a second elevation, relative to the drawbar support.

Specifically, for example when an implement, in particular an agricultural baler, includes the drawbar, the coupling means can therefore assume two different positions, in particular two elevations, relative to the implement and/or the ground or soil. The drawbar support can be configured in a single piece or a plurality of pieces, i.e. in particular can comprise one or more components. Specifically, the drawbar support can be configured as a rigid and/or single-piece drawbar support. In one implementation, in an operating state of the drawbar, such as when the drawbar or the implement is hitched to the towing vehicle, the drawbar support can be configured as a rigid and/or single-piece drawbar support.

The drawbar allows the implement to be connected to a towing vehicle, for example an agricultural tractor or another towing unit from the agricultural or industrial fields or also the transport industry, in order to be moved thereby. In this operating state, the drawbar can assume two different positions, in particular two elevations, relative to the towing vehicle. The drawbar can moreover include an adjustment means. The drawbar can be pivoted about a vertical axis, i.e., an upward ordinate axis, by means of the adjustment means, for example an actuator, a hydraulic cylinder or a servomotor such that the implement, when in operational use, does not directly trail a towing vehicle, but follows an offset track.

In this way the drawbar can be flexibly adapted to different requirements without requiring additional components and/or complex alterations. Requirements of this type can be, in particular, bringing the drawbar into a position or elevation suitable for hitching it to an available towing vehicle. Towing vehicles frequently have towing equipment, in particular what are known as hitches, which have at least a lower and/or an upper hitch point. In addition, the size and/or type of towing vehicle or else the tire type can influence the required elevation of the coupling means. In one implementation, the implement may be in particular an agricultural baler, such as a baler for producing round/cylindrical bales from harvested crops, for example in the form of hay, straw or silage. It is also conceivable, however, that the implement is a baler for producing cuboid-shaped bales or another implement, for example a trailer or loading wagon. It can also conceivably be used in the industrial field or the transport industry.

In one configuration of the disclosure, the drawbar support includes a pivot arm and a drawbar arm, wherein a first end of the drawbar arm is connected to the pivot arm, in particular releasably connected, or the first end of the drawbar arm is fastened to or installed on, in particular releasably fastened to or releasably installed on, the pivot arm. In other words, the first end of the drawbar arm can be connected to the pivot arm, or the first end of the drawbar arm can be fastened to or installed on the pivot arm, in such a way that the drawbar support is configured as a rigid and/or single-piece drawbar arm. A second end of the drawbar arm is connected, in particular rigidly and/or releasably connected, to the coupling means, or the second end of the drawbar arm is fastened, in particular rigidly and/or releasably fastened, to the coupling means or is installed, in particular rigidly and/or releasably installed on the coupling means.

The drawbar support is configured in such a way that the drawbar arm is connectable or connected, in particular rigidly and/or releasably connectable and/or connected, to the pivot arm in two operating positions, in particular a first or a second operating position, such that the coupling means, by way of the drawbar support, in particular the drawbar arm, can be brought into, in particular is arranged in, two different positions, in particular elevations, relative to the drawbar support, in particular relative to the pivot arm. In other words, the drawbar arm can be connectable to the pivot arm in two operating positions in such a way that the coupling means can assume two different positions, in particular elevations, relative to the drawbar support, in particular relative to the pivot arm, or can be arranged in two different positions. The drawbar arm can therefore be configured in such a way that the drawbar arm can be fastened to and/or installed on, in particular can be rigidly and/or releasably fastened to and/or installed on, the pivot arm in a first or a second operating position. Specifically, when the drawbar arm is connected to the pivot arm in the first operating position, the coupling means can be brought into, in particular arranged in, the first position, in particular a first elevation, relative to the drawbar support. Moreover, when the drawbar arm is connected to the pivot arm in the second operating position, the coupling means can be brought into, in particular arranged in, a second position which differs from the first position, in particular a second elevation, relative to the drawbar support, in particular relative to the pivot arm. Preferably, in an operating state of the drawbar, such as when the drawbar or the implement is hitched to the towing vehicle, the drawbar support can be configured as a rigid and/or single-piece drawbar support. In the operating state, the drawbar arm can therefore be securely connected to the pivot arm such that the drawbar support can be configured as a rigid and/or single-piece drawbar support. The drawbar arm can in this case be configured in such a way that it can be brought into, in particular can be arranged in, the at least two operating positions, based on the pivot arm, by means of a rotational movement, in which positions the coupling means assumes different positions, in particular elevations. The drawbar has the advantages set out above.

A simple and stable construction is obtained when the drawbar arm has two frame portions which are arranged so as to be V-shaped. The coupling means is preferably arranged at the apex of the drawbar arm or adjacent thereto, which results in favorable force distribution in the drawbar arm. The coupling means is preferably rotatably and/or pivotably connected to the drawbar arm or the frame portions thereof, such that its position can be adapted in a simple manner, for example in relation to the drawbar arm.

In one configuration of the disclosure, the pivot arm and the drawbar arm each have one or more connection regions. The connection regions can preferably be arranged so as to overlap. Furthermore, or alternatively, the pivot arm and the drawbar arm are connected to one another, in particular at least secured so as to be rotationally engaged with respect to one another, by means of fastening means which cooperate with aligned recesses in the connection regions. The fastening means can for example be bolts or screws which can be inserted through the aligned recesses and secured in the pivot arm or the drawbar arm via suitable securing means, for example in the form of nuts, pins or screw threads.

Specifically, the pivot arm and the drawbar arm can have at least two recesses respectively per connection region, preferably 2 to 20 recesses respectively per connection region, particularly preferably 5 to 10 recesses respectively per connection region. Per connection region, at least two recesses of the pivot arm and the drawbar arm respectively, preferably 2 to 20 recesses of the pivot arm and the drawbar arm respectively, particularly preferably 5 to 10 recesses of the pivot arm and the drawbar arm respectively, can be arranged so as to align with one another and be connected by fastening means. In this case, at least two fastening means can be used per connection region, preferably 2 to 20 fastening means per connection region, particularly preferably 5 to 10 fastening means per connection region, in order to connect the pivot arm to the drawbar arm via the aligned recesses. The recesses of a connection region of the pivot arm can also be arranged so as to be offset relative to the recesses of a corresponding connection region of the drawbar arm. As a result, the drawbar arm can be connectable to the pivot arm in further additional operating positions, i.e., in particular more than two operating positions, such that the coupling means can assume additional positions, in particular additional elevations, i.e. more than two positions or elevations, relative to the drawbar support, in particular relative to the pivot arm. The distance between two recesses can be from 10 mm to 100 mm, preferably from 30 mm to 60 mm, particularly preferably 40 or 50 mm. It is also conceivable, however, that, on one or both connection regions, projections are provided which cooperate with corresponding openings in the other connection region and/or can be secured correspondingly therein. This advantageously allows the drawbar support to be configured as a rigid and/or single-piece drawbar support.

Preferably, when viewed laterally, the drawbar arm is, or the frame portions are, configured at least approximately as a non-isosceles, in particular right-angled, triangle.

A particularly simple construction is obtained when the right angle of the triangle is adjacent to the fastening regions and/or is provided at a distance from the apex.

It is particularly simple when the drawbar arm is installable on the pivot arm in two operating positions which are preferably symmetrical about the side of the triangle opposite the longest side of the triangle. In other words, the drawbar arm can be connectable to the pivot arm in two operating positions, for example in the first and second operating position, due to the fact that the drawbar arm can be rotated by 180 degrees.

A simple adjustment option is obtained when the drawbar arm is connected to the pivot arm so as to be pivotable about an at least substantially first pivot axis. The coupling means can therefore assume different elevations depending on the pivot position of the drawbar arm.

If both the pivot arm and the drawbar arm have toothed disks, the drawbar arm can be secured on the pivot arm in different rotational positions. For this purpose, the toothed disks are each brought into a position in which they lock via the respective teeth thereof and can be secured, for example by means of a screw connection.

The disclosure further relates to an agricultural implement, in particular an agricultural baler, including a drawbar as described above. The agricultural implement has the advantages of the drawbar according to the disclosure. The agricultural baler can be a press for forming round/cylindrical bales, but also cuboid-shaped bales. The implement can, however, also be configured in the form of a loading wagon or another towed tool. It can, however, also be a conventional trailer for receiving and/or transporting agricultural material in particular. The implement can, however, also be used in the industrial field or the transport industry.

In one configuration of the disclosure, the implement includes a frame, wherein the drawbar is connected, in particular pivotably and/or releasably connected, to the frame. The drawbar can be directly or indirectly connected to the frame.

The implement may advantageously include a drawbar holder. The drawbar holder is connected to the frame and the drawbar, in particular the pivot arm. Specifically, the draw-bar, preferably the drawbar holder, particularly preferably the pivot arm, is pivotably connected to the drawbar holder, in particular is mounted and/or connected so as to be pivotable about a vertical axis. The drawbar moreover includes an adjustment means for adjusting the drawbar. In this case, adjust can be understood to mean swiveling the drawbar in relation or with respect to the implement. The drawbar, preferably the drawbar support, particularly preferably the pivot arm, can therefore be pivotable by means of the adjustment means, in particular pivotable in relation or with respect to the implement.

In one configuration of the disclosure, the drawbar holder is connected to an axle housing, in particular is connected so as to be pivotable about a second pivot axis, and the axle housing is connected to, preferably releasably connected to, particularly preferably installed on and/or fastened to, the frame of the baler. The drawbar holder can be connected to the axle housing by means of one or more bolts so as to be pivotable about the second pivot axis.

In one configuration of the disclosure, a first end of the adjustment means is connected to the pivot arm and a second end is connected to the drawbar holder. The drawbar, pref-erably the pivot arm, can be pivoted by the adjustment means, in particular about the vertical axis, relative to the drawbar holder and/or the frame, in particular relative to the implement.

The above features and advantages and other features and advantages of the present teachings are readily apparent from the following detailed description of the best modes for carrying out the teachings when taken in connection with the accompanying drawings.

DETAILED DESCRIPTION

Figure 1:
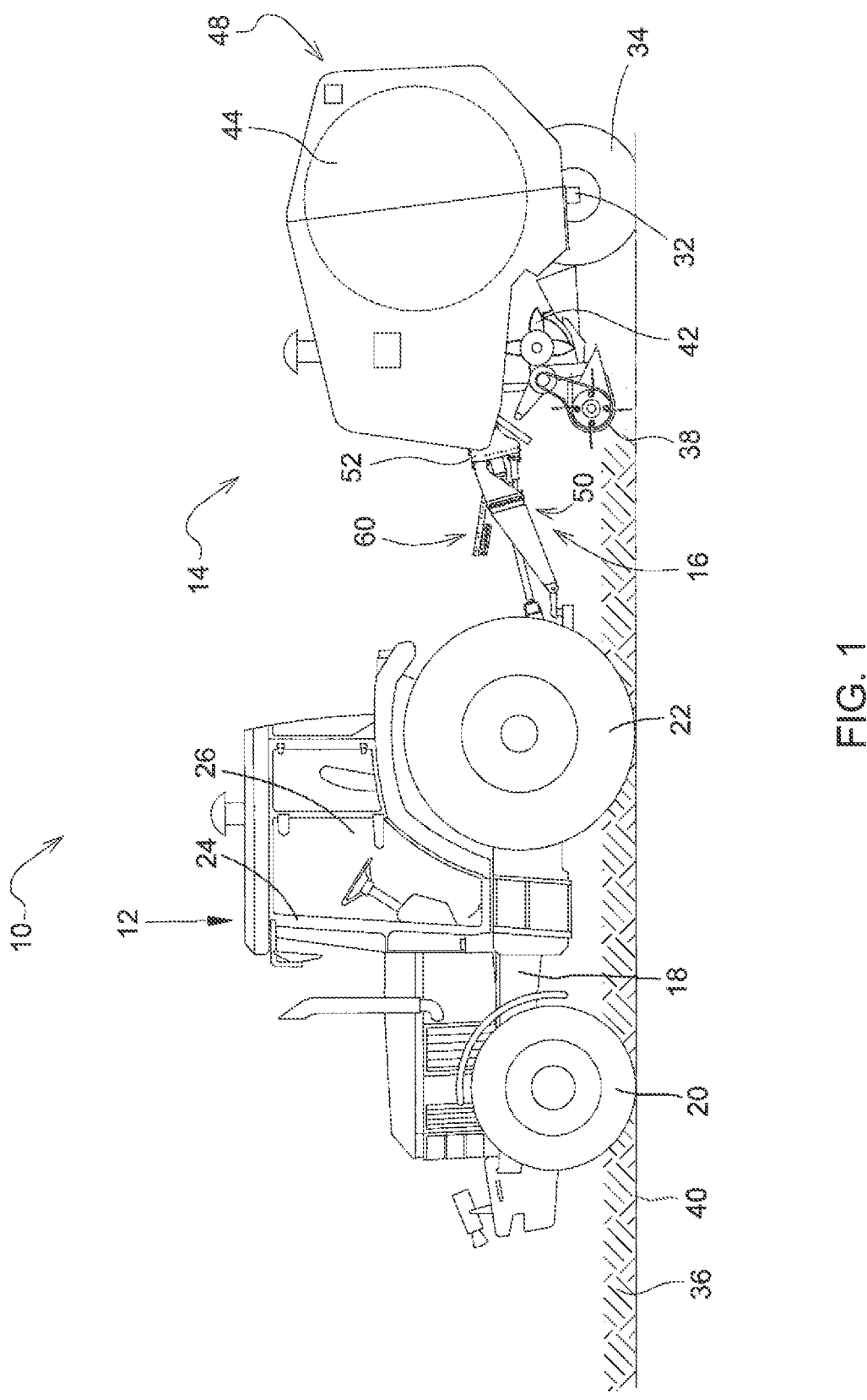
FIG. 1 is a side view of a towing-vehicle-implement-combination including a towing vehicle and an implement according to the disclosure, which is coupled to the towing vehicle by means of a drawbar according to the disclosure.

Those having ordinary skill in the art will recognize that terms such as "above," "below," "upward," "downward," "top," "bottom," etc., are used descriptively for the figures, and do not represent limitations on the scope of the disclo-sure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "trans-verse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include indi-vidual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a towing-vehicle-implement-combination is generally shown at 10. The com-bination 10 includes a towing vehicle 12 in the form of a traction unit or tractor and an agricultural implement 14 which in the present exemplary embodiment is configured as an agricultural baler, in particular a round baler. The towing vehicle 12 and the implement 14 are coupled by means of a drawbar 16.

The towing vehicle 12 can have a frame 18, which is supported on steerable front wheels 20 and rear wheels 22, and a cab 24 in which an operator station 26 is located. In turn, the implement 14 can have a frame 32 which is supported via wheels 34 on the ground 40 or soil. Further-more, a processing element 38 configured in the form of a take-up unit, for example a pickup, for taking up harvested crops lying on the ground 40 in a swathe 36 and a conveyor 42, which conveys the harvested crops taken up by the processing element 38 into a bale chamber 44, are provided. The processing element 38 is movably connected in a known manner to the frame 32 and can furthermore be supported via one or more wheels (not shown) on the ground 40. The baling chamber 44 is delimited in a manner known per se by pressing means (not shown). A completed bale can be discharged via a discharge flap 48, which can pivot upward, and be deposited on the ground 40.

The agricultural implement 14 can include the drawbar 16. Moreover, the implement 14 includes a drawbar holder 52. The drawbar holder 52 is connected to the frame 32 and the drawbar 16, preferably a drawbar support 50, 50', particularly preferably a pivot arm 64, 64' (see FIG. 2). Specifically, the drawbar holder 52 is connected to an axle housing 58 (see FIG. 2), in particular connected so as to be pivotable about a second pivot axis B (see FIG. 2). The axle housing 58 is connected to the frame 32 of the implement 14, in particular installed thereon or fastened thereto. Specifically, the drawbar 16 can, however, also be connected directly to the frame 32.

In all exemplary embodiments, the drawbar 16 and/or in particular the implement 14 comprises/comprise an adjuster 82. The adjuster 82 may hereinafter be referred to as the adjustment means 82. The adjusting means 82 may include, but is not limited to, an actuator, hydraulic cylinder or servomotor. The drawbar 16, preferably the drawbar support 50, 50', particularly preferably the pivot arm 64, 64', can be pivoted by means of the adjustment means 82. In this arrangement, in particular a first end of the adjustment means 82 can be connected to the pivot arm 64, 64' and a second end can be connected to the drawbar holder 52, such that the drawbar can be pivoted by the adjustment means 82, in particular about a vertical axis A, relative to the frame 32 or the implement 14, preferably the pivot arm 64, 64' can be pivoted relative to the drawbar holder 52.

Figure 2:
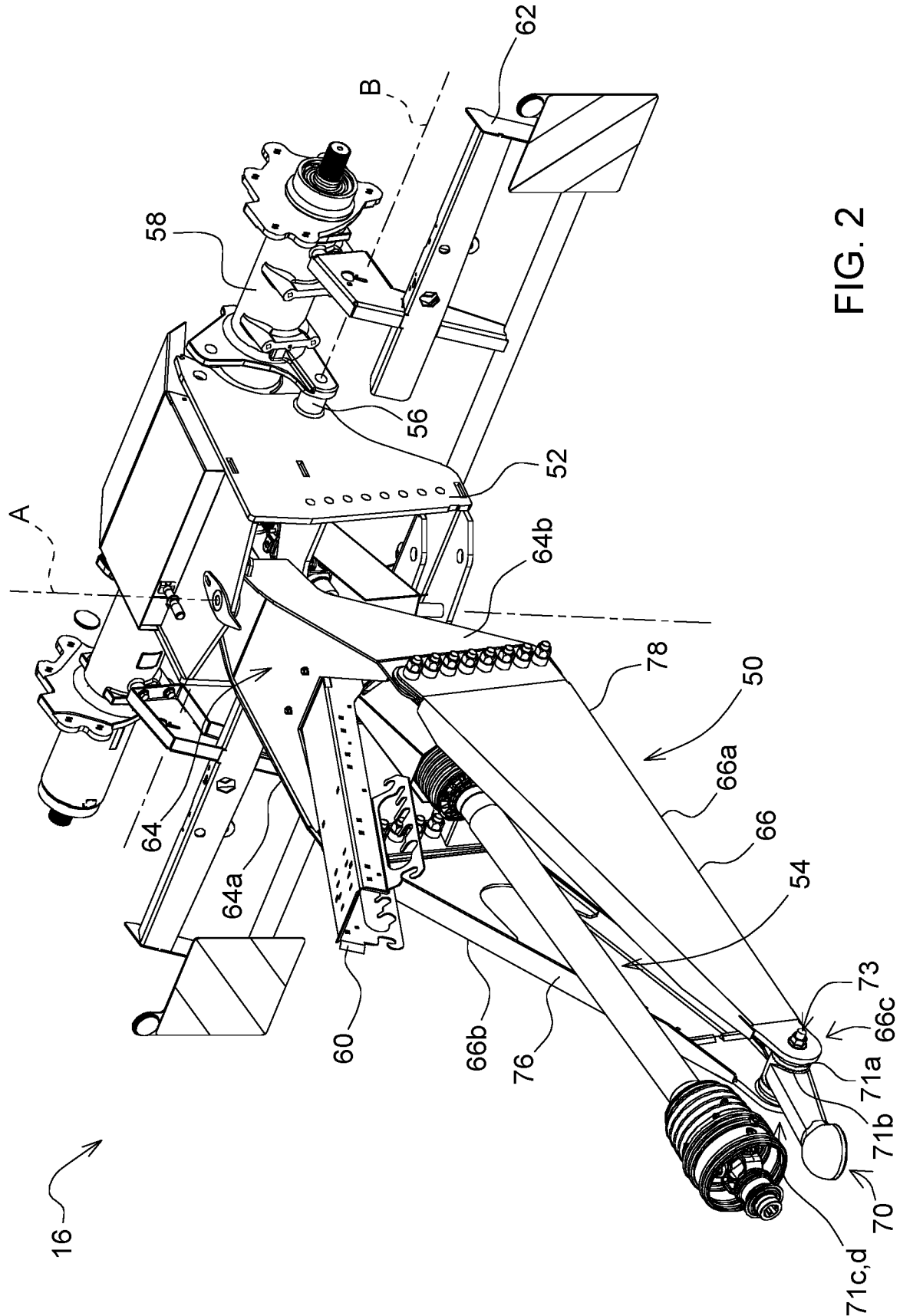
FIG. 2 is a schematic view of a first exemplary embodi-ment of the drawbar according to the disclosure.

FIG. 2 shows a schematic view of a first exemplary embodiment of the drawbar according to the disclosure with a portion of the implement 14. The drawbar 16 shown in FIG. 2 corresponds substantially to the drawbar 16 shown in FIG. 1, and therefore only details and/or differences are discussed below. The agricultural implement 14 can comprise the drawbar 16 as shown in FIG. 2.

The implement 14 can be hitched to the towing vehicle 12 by means of the drawbar 16 or can be hitched via it, as shown in FIG. 1. The drawbar 16, preferably the drawbar support 50, 50', particularly preferably the pivot arm 64, 64', is pivotably connected to the drawbar holder 52, in particular mounted so as to be pivotable about the vertical axis A. Specifically, the drawbar 50 is accommodated on the drawbar holder 52 so as to be pivotable about the vertical axis A.

The drawbar 16 includes the drawbar support 50, 50' and a coupler 70. The coupler may hereinafter be referred to as the coupling means 70. The coupling means 70 is connected to the drawbar support 50,50'. The drawbar support 50, 50' is configured in such a way that the coupling means 70 can be brought by the drawbar support 50, 50' into two different positions, in particular elevations, relative to the drawbar support 50, 50'. The drawbar support 50, 50' includes the pivot arm 64, 64' and a drawbar arm 66, 66'. A first end of the drawbar arm 66, 66' is connected to the pivot arm 64, 64' and a second end of the drawbar arm 66, 66' is connected to the coupling means 70. The drawbar arm 66, 66' is configured in such a way that the drawbar arm 66, 66' is connectable or connected, in particular rigidly and/or releasably connectable or connected, to the pivot arm 64, 64' in a first or a second operating position, such that the coupling means 70, by way of the drawbar support 50, 50', can be brought into and/or is arranged in two different positions, in particular elevations, relative to the drawbar support 50, 50', in particular relative to the pivot arm 64, 64'.

The implement 14 includes a drive unit 54, by means of which mechanical drive power can be transmitted from the towing vehicle 12 to the implement 14. For this purpose, the drive unit 54 can be connected in a known manner to a power take-off shaft of the towing vehicle 12.

The drawbar holder 52 is connected to an axle housing 58, in particular by means of bolts 56, so as to be pivotable about the second pivot axis B. In the axle housing 58, which is fastened to the frame 32 of the implement 14, a drive axle (not shown) is arranged, by means of which driven components, such as the processing means 38 or one or more of the pressing means (not shown) can be driven. Furthermore, a holder 60, which extends upward from the drawbar 16 and serves to receive lines and cables (not shown), and a deflector 62 are provided.

Figure 3A:
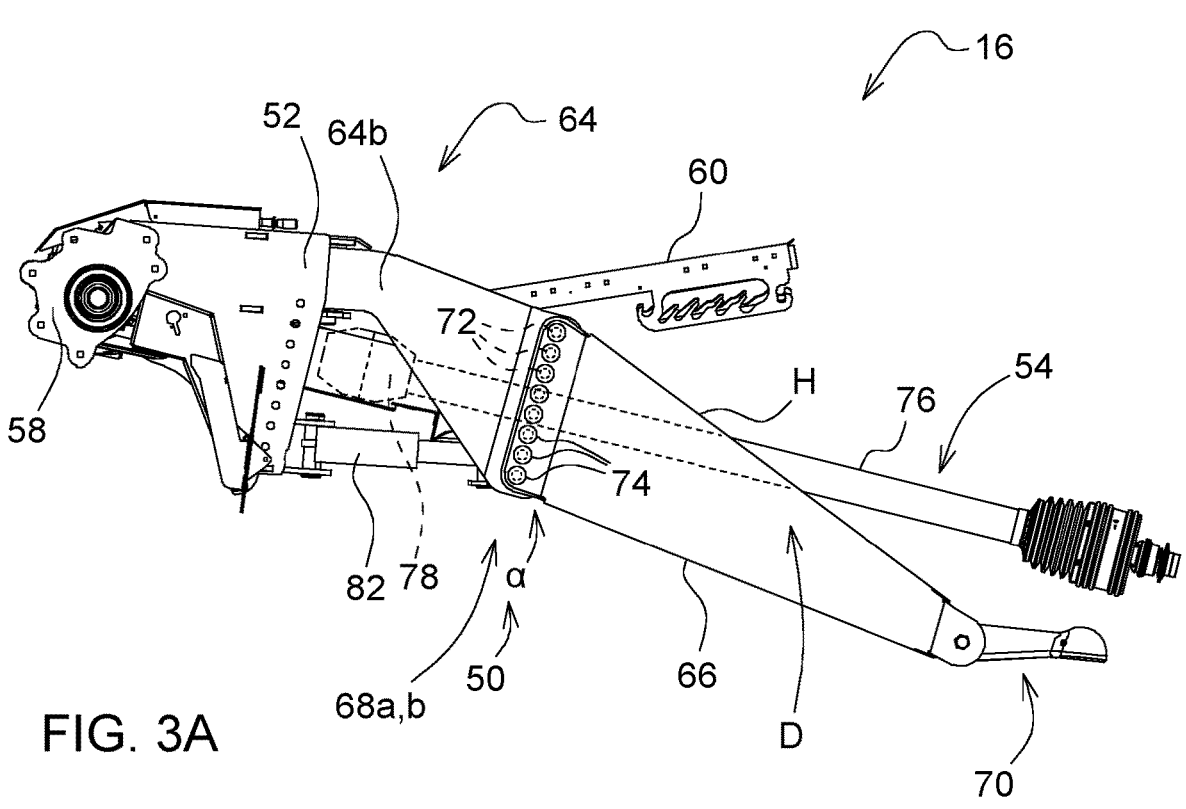
FIG. 3A is a schematic side view of the first exemplary embodiment of the drawbar according to the disclosure.
Figure 3B:
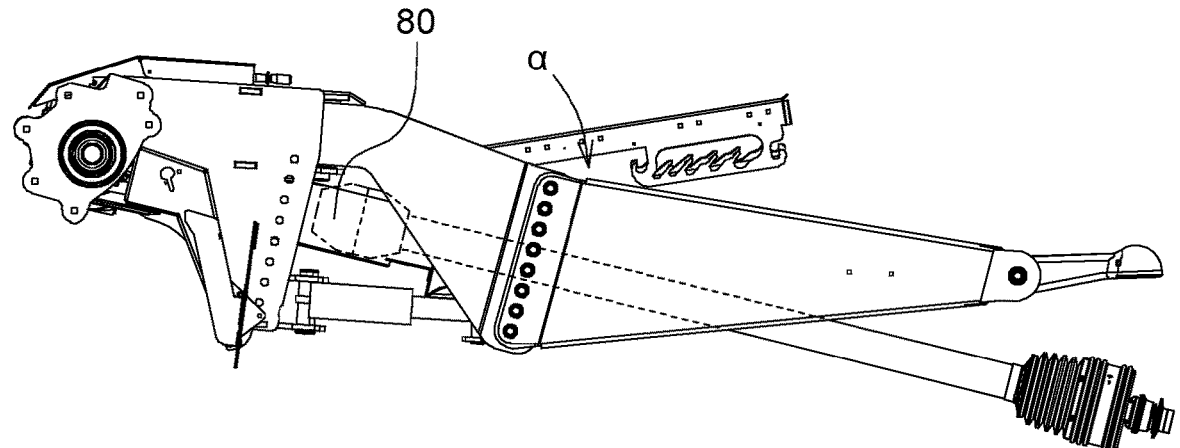
FIG. 3B is a schematic side view of the first exemplary embodiment of the drawbar according to the disclosure.

FIGS. 3A and 3B each show a schematic side view of the first embodiment of the drawbar according to the disclosure. The drawbar 16 shown in FIGS. 3A and 3B corresponds substantially to the drawbar 16 shown in FIGS. 1 and 2, and therefore only details and/or differences are discussed below. The agricultural implement 14 can include the drawbar 16 as shown in FIG. 3.

In turn, the pivot arm 64 has an upper support 64*a* (see FIG. 2), lateral portions 64*b* and an inner support (indicated only). The drawbar arm 66 has a first frame portion 66*a* and a second frame portion 66*b* which, when viewed from above, are arranged so as to be substantially V-shaped. The coupling means 70 is provided at the apex 66*c* of the frame portions 66*a*, 66*b*. FIGS. 3A, 3B clearly show that the frame portions 66*a*, 66*b*, when viewed laterally, are each configured in the form of an approximately right-angled triangle D, wherein the right angle α of the triangle D is arranged opposite the apex 66*c*.

The coupling means 70 is releasably connected to the drawbar arm 66 or the frame portions 66*a*, 66*b*. For this purpose, toothed disks 71*a*, 71*b*, 71*c*, 71*d*, which can lock with one another in different angular positions and can be secured by means of a screw connection 73, are provided on the coupling means 70 and the frame portions 66*a*, 66*b* respectively.

The pivot arm 64 and the drawbar arm 66 are releasably connected to one other. For this purpose, both the pivot arm 64 or the lateral portions 64*b* thereof and the drawbar arm 66 or the frame portions 66*a* thereof each have a connection region 68*a*, 68*b*, in which recesses 72*a*, 72*b* are provided. According to the present exemplary embodiment, the recesses 72*a*, 72*b* are configured in the form of holes arranged approximately vertically in a row and, in order to connect the pivot arm 64 and the drawbar arm 66, can be aligned so as to be flush in such a way that at least two of the recesses 72*a* of the pivot arm 64 can be connected to at least two of the recesses 72*b* of the drawbar arm 66 by means of at least one fastener 74. The at least one fastener 74 may hereinafter be referred to as the fastening means 74. The fastening means 74 may include for example but is not limited to screw fittings or bolt connections. In the exemplary embodiment shown, four fastening means 74 are provided.

The drive unit 54 has a drive shaft 76 and an angle gear 78 and is guided between the frame portions 66*a*, 66*b* to the pivot arm 64, where the angle gear 78 is mounted in the inner support 64*c* of the pivot arm 64. The angle gear 76 can be actively connected via an articulated shaft 80 shown in FIG. 3B via a gear mechanism (not shown) to the drive shaft (also not shown) arranged in the axle housing 58.

Furthermore, the adjustment means 82 configured in the form of a hydraulic cylinder is provided, which is articulated at one end to the drawbar holder 52 and at the other end to the pivot arm 64, 64', so as to be able to pivot the drawbar support 50, 50' or the drawbar 50 about the vertical axis A with respect to the drawbar holder 52.

The exact mode of operation of the variable drawbar 50 will be addressed below. FIGS. 3A and 3B show that the upper support 64 and the drawbar arm 66 can be connected in the different positions.

According to FIG. 3A of the drawings, the hypotenuse H of the substantially right-angled triangle D is arranged at the top, based on the ground 40. In contrast, the hypotenuse H in FIG. 3B is arranged at the bottom, based on the ground 40. In this manner, it is possible to change the elevation of the apex 66*c*, and therefore of the coupling means 70.

Since the coupling means 70 is releasably connected to the drawbar arm 66 or the frame portions 66*a*, 66*b*, it can be rotated by 180° to adapt to the rotational position of the drawbar arm 66. It can furthermore be locked in different angular positions by means of the toothed disks 71*a*, 71*b*, 71*c*, 71*d*. It can be secured in the desired angular position or location by means of the screw connection 73.

Furthermore and/or in addition, the elevation of the apex or the coupling means 70 can be varied by means of the recesses 72*a*, 72*b* and the associated fastening means 74. As shown, the recesses 72*a*, 72*b* in the pivot arm 64 and/or the drawbar arm 66 are arranged so as to be flush in such a way that fastening means 74 can be inserted therein and secured. It is also possible, then, to arrange the recesses 72*a*, 72*b* in such a way that, based on the pivot arm 64, the drawbar arm 66 is arranged higher or lower such that the elevation of the coupling means 70 can be modified further. Preferably, however, at least two fastening means 72 are to be provided for connecting the pivot arm 64 to the drawbar arm 66.

Figure 4:
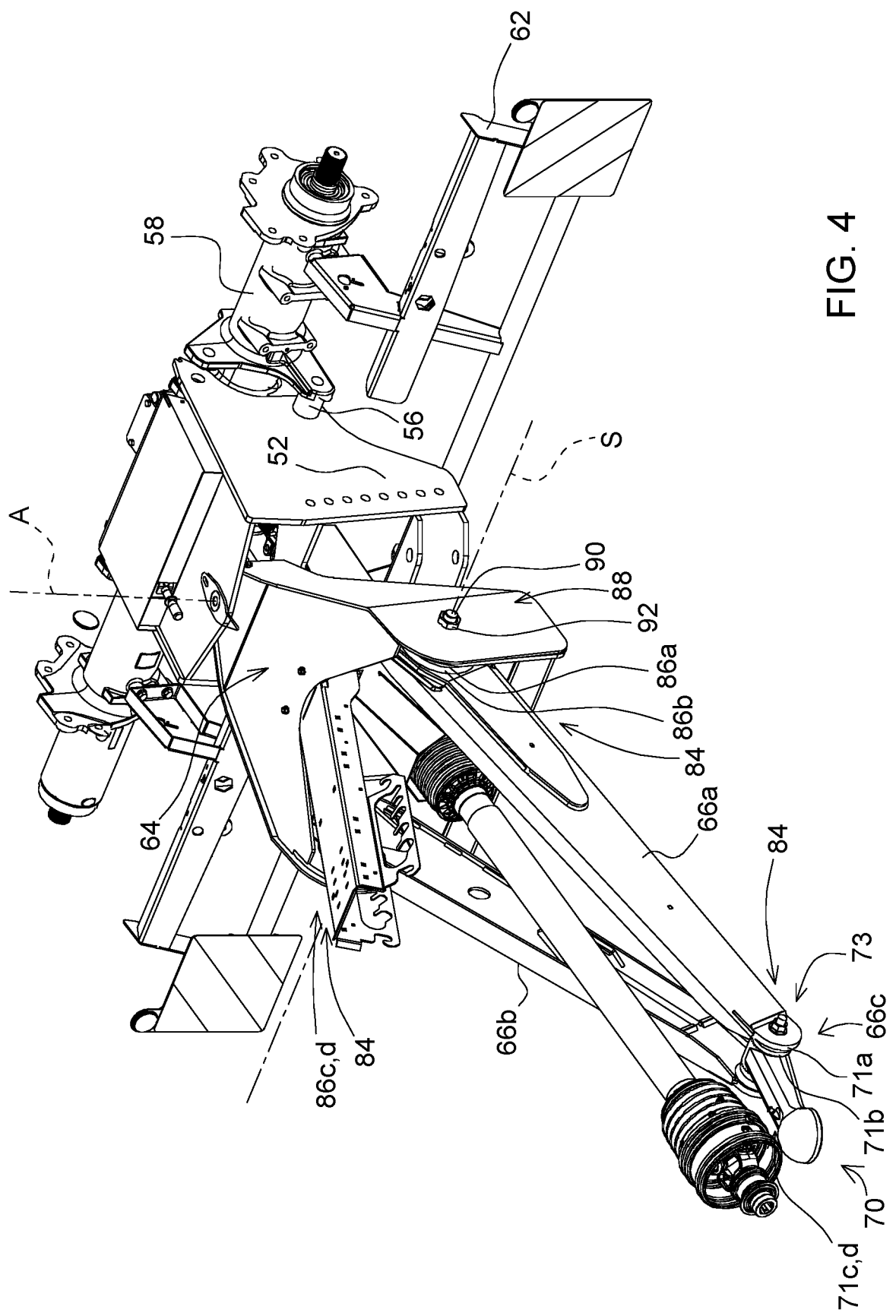
FIG. 4 is a schematic view of a second exemplary embodiment of the drawbar according to the disclosure.
Figure 5A:
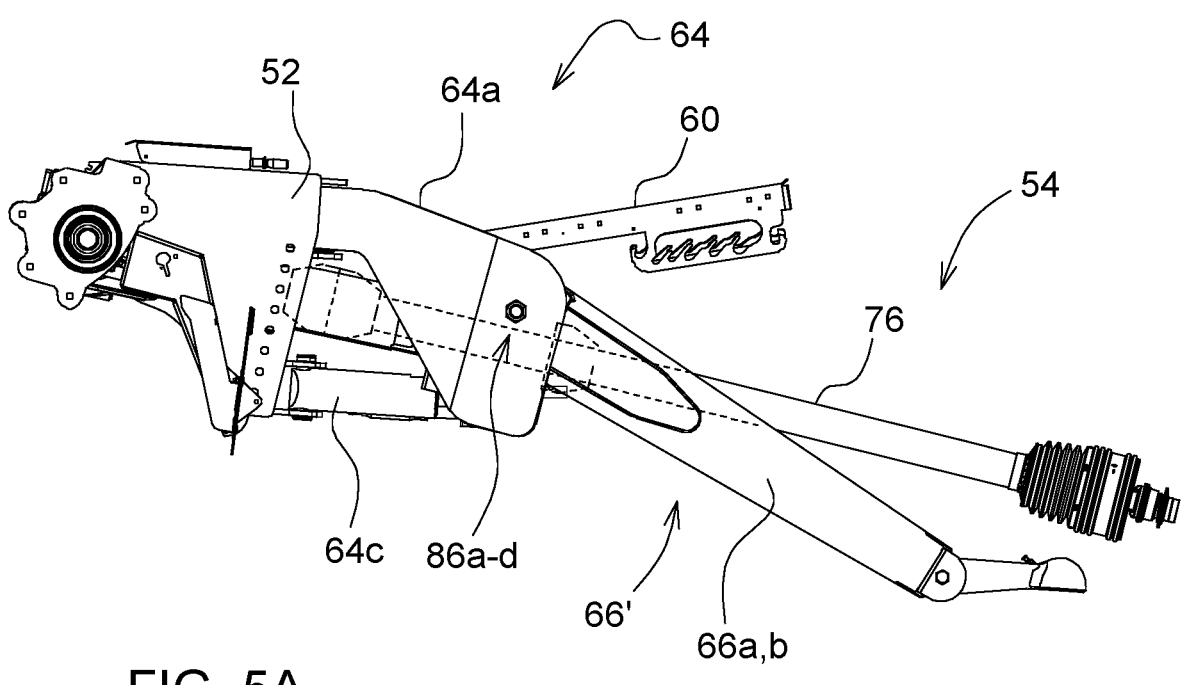
FIG. 5A is a schematic side view of the second exemplary embodiment of the drawbar according to the disclosure.
Figure 5B:
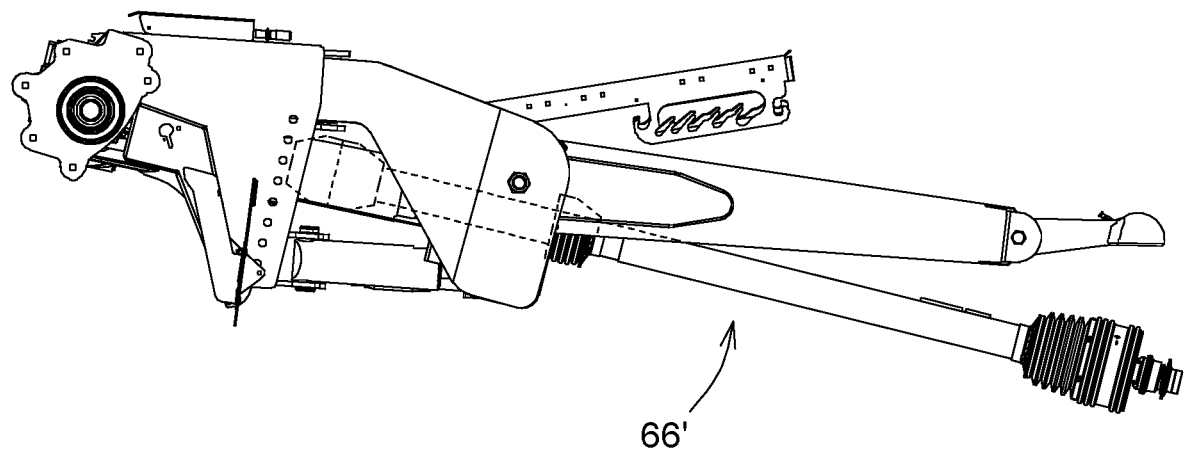
FIG. 5B is a schematic side view of the second exemplary embodiment of the drawbar according to the disclosure.

FIG. 4 shows a schematic view of a second exemplary embodiment of the drawbar 16 according to the disclosure with a portion of the implement 14. FIGS. 5A and 5B each show a schematic side view of the second exemplary embodiment of the drawbar 16 according to the disclosure in different positions. The drawbar 16 shown in FIGS. 4, 5A and 5B corresponds substantially to the drawbar 16 shown in FIGS. 1, 2 3A and 3B, and therefore only details and/or differences are discussed below. The agricultural implement 14 can comprise the drawbar 16 as shown in FIGS. 4, 5A and 5B. The same reference signs are used for components corresponding to the first embodiment, equivalent components are indicated with an apostrophe and new components are assigned new numbers.

The drawbar arm 66' of the drawbar 16 according to the second exemplary embodiment has first and second frame portions 66'*a*, 66'*b* which are configured so as to be substantially symmetrical and, in the case shown, in the form of square supports. In a region 84 facing the pivot arm 64', each frame portion 66'*a*, 66'*b* has a toothed disk 86*a*, *c* which can lock with corresponding toothed disks 86*b*, *d* provided on the pivot arm 64'. For this purpose, a screw connection 88 including a bolt 90 and a nut 92 is provided in each region 84*a*, 84*b*. The bolt extends in each case through openings (not shown) in each frame portion 66'*a*, 66'*b*, the corresponding toothed disks 86*a*, 86*b*, 86*c*, 86*d* and the pivot arm 64' and defines a first pivot axis S about which the drawbar arm 66'*a* can pivot with respect to the pivot arm 64' when the toothed disks 86 *a-d* are not engaged.

In a region 94 opposite the regions 76*a*, 76*b*, a coupling means 70 configured according to the first exemplary embodiment is provided, which is releasably and pivotally connected to the drawbar arm 66' or the frame portions 66'*a*, 66'*b* thereof via a screw connection 73 which cooperates with the toothed disks 71*a*, 71*b*, 71*c*, 71*d*.

In FIGS. 5A, B, the drawbar 16 is shown in two different positions. In the first position according to FIG. 5A, the drawbar arm 66' is shown swiveled downward about the first pivot axis S and in FIG. 5B it is swiveled upward. In order to transfer the drawbar arm 66' from one position to the other, the screw connection 88 is released such that the toothed disks 86*a-d* are no longer secured in a locked position, and the drawbar arm 66' is swiveled into the desired position, in which it is secured once again by means of the screw connection 78, the toothed disks 86 *a-d* locking securely with one another. In addition to the positions shown, the drawbar arm 66' and therefore the drawbar 16 can assume further positions and therefore a plurality of elevations.

The coupling means 70 can be brought into different angular positions in a corresponding manner so as to be able to assume an appropriate position for hitching to the towing vehicle 12. In contrast to the first exemplary embodiment, the coupling means 70 according to the second exemplary embodiment is not rotated, only swiveled.

Figure 6:
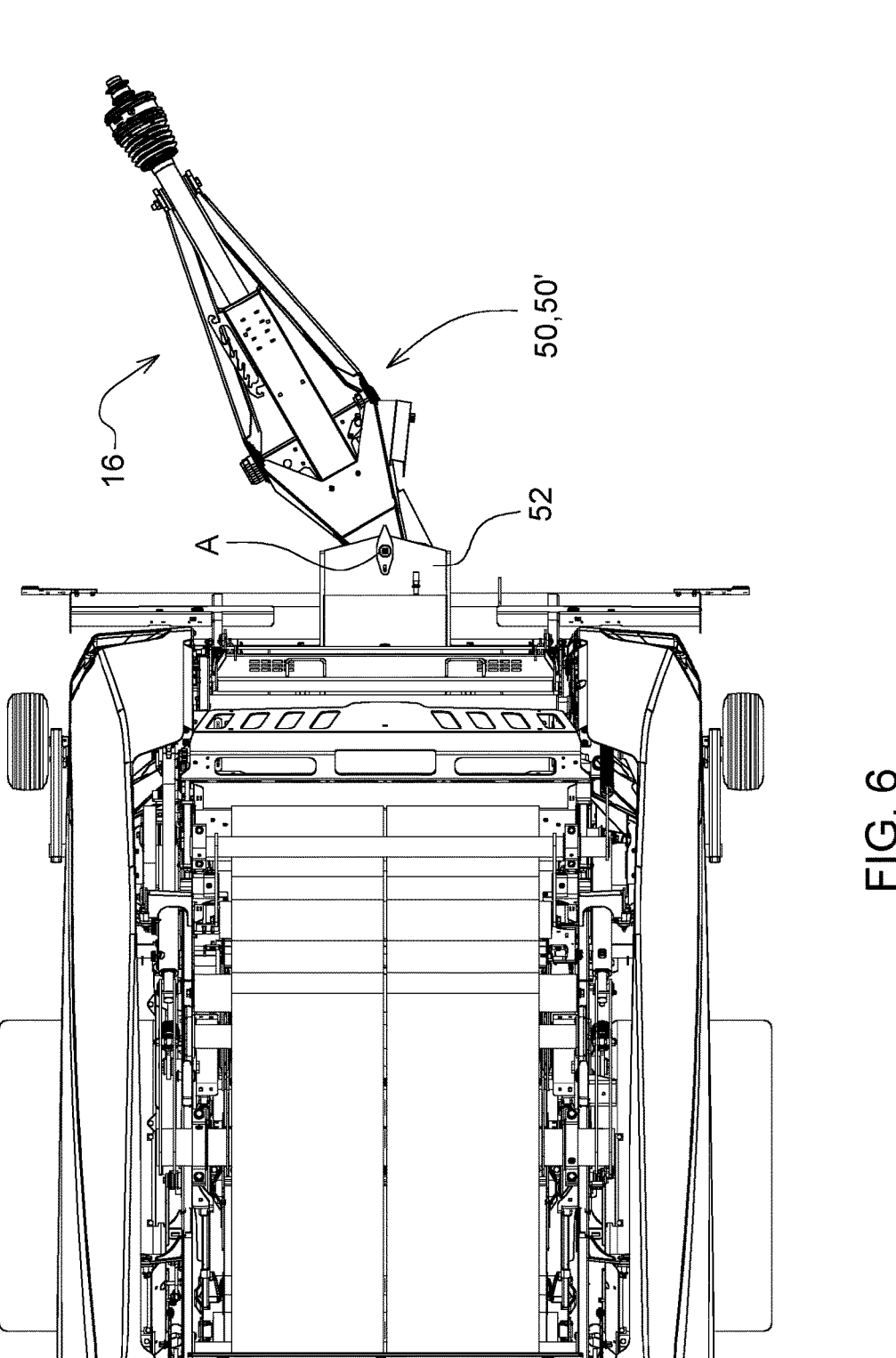
FIG. 6 is a schematic plan view from above of the implement including a drawbar according to the disclosure.

FIG. 6 shows a schematic view of the implement 14 according to the disclosure including the drawbar 16 according to the disclosure. The implement 14 and the drawbar 16 shown in FIG. 6 correspond substantially to the drawbar 16 and implement 14 shown in FIGS. 1 to 5, and therefore only details and/or differences are discussed below. FIG. 6 shows the drawbar support 50, 50' and the drawbar 16, which is swiveled in a known manner with respect to the implement 14 and the drawbar holder 52 about the vertical axis A The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A drawbar for an agricultural implement, the drawbar comprising:
a drawbar support;
a coupler connected to the drawbar support, wherein the drawbar support is configured such that the coupler is moved by the drawbar support into two different positions relative to the drawbar support;
wherein the drawbar support includes a pivot arm and a drawbar arm, a first end of the drawbar arm being connected to the pivot arm and a second end of the drawbar arm being connected to the coupler, wherein the drawbar arm is connectable to the pivot arm in two operating positions such that the coupler can be brought by the drawbar support into two different positions relative to the drawbar support;
wherein the pivot arm is configured for pivotally attachment to a frame of the agricultural implement for pivotal movement about a vertical axis, and wherein the drawbar support includes an adjuster for moving the drawbar support about the vertical axis; and
wherein a first end of the adjuster is connected to the pivot arm, and a second end of the adjuster is configured for attachment to the frame, and wherein the drawbar support is pivotably moveable by the adjuster about the vertical axis, relative to the frame.

2. The drawbar set forth in claim 1, wherein the drawbar arm has two frame portions which are arranged so as to be V-shaped, wherein the coupler is arranged adjacent an apex of the drawbar arm and the coupler moveably connected to the drawbar arm or the frame portions thereof.

3. The drawbar set forth in claim 2, wherein the pivot arm and the drawbar arm each have a connection region which can be arranged in a preferably overlapping manner, and/or are connected to one another by means of fastener which cooperate with aligned recesses in the connection regions.

4. The drawbar set forth in claim 3, wherein the drawbar arm or the frame portions, when viewed laterally, at least approximately form a right-angled triangle.

5. The drawbar set forth in claim 4, wherein a right angle of the triangle is adjacent to the connection regions and is provided at a distance from the apex.

6. The drawbar set forth in claim 4, wherein the drawbar arm can be installed on the pivot arm in two positions which are symmetrical about the side of the triangle opposite a hypotenuse of the triangle.

7. The drawbar set forth in claim 1, wherein the drawbar arm is connected to the pivot arm so as to be pivotable about an at least substantially first pivot axis.

8. A baler implement comprising:

a frame;

a drawbar support connected to the frame;

a drawbar holder connected to the frame and the drawbar support;

wherein the drawbar support is pivotably connected to the drawbar holder for pivotal movement about a vertical axis, and wherein the drawbar support includes an adjuster for moving the drawbar support about the vertical axis;

a coupler connected to the drawbar support, wherein the drawbar support is configured such that the coupler is moved by the drawbar support into two different positions relative to the drawbar support;

wherein the drawbar support includes a pivot arm and a drawbar arm, a first end of the drawbar arm being connected to the pivot arm and a second end of the drawbar arm being connected to the coupler, and wherein a first end of the adjuster is connected to the pivot arm and a second end of the adjuster is connected to the drawbar holder, and wherein the drawbar support is pivotably moveable by the adjuster about the vertical axis, relative to the drawbar holder and the frame.

9. The baler implement set forth in claim 8, wherein the drawbar holder is connected to an axle housing, for pivotal movement about a second pivot axis, and wherein the axle housing is connected to the frame of the implement.

\* \* \* \* \*